United States Patent
Nagahiro

(10) Patent No.: US 10,448,446 B2
(45) Date of Patent: Oct. 15, 2019

(54) INFORMATION PROCESSING APPARATUS WITH COMMUNICATION MODE SWITCHING, CONTROL METHOD, AND PROGRAM

(71) Applicant: Sony Corporation, Tokyo (JP)

(72) Inventor: Koji Nagahiro, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/505,403

(22) PCT Filed: Nov. 11, 2015

(86) PCT No.: PCT/JP2015/005631
§ 371 (c)(1),
(2) Date: Feb. 21, 2017

(87) PCT Pub. No.: WO2016/103556
PCT Pub. Date: Jun. 30, 2016

(65) Prior Publication Data
US 2017/0273131 A1    Sep. 21, 2017

(30) Foreign Application Priority Data

Dec. 26, 2014    (JP) .................................. 2014-265649

(51) Int. Cl.
*H04N 5/232*    (2006.01)
*H04W 76/15*    (2018.01)
(Continued)

(52) U.S. Cl.
CPC ............ *H04W 76/15* (2018.02); *G06F 21/43* (2013.01); *G06F 21/445* (2013.01);
(Continued)

(58) Field of Classification Search
CPC .............. H04L 63/0876; H04L 63/083; H04N 5/23203; H04N 5/23206; H04N 5/23293; H04N 21/4223
(Continued)

(56) References Cited

U.S. PATENT DOCUMENTS

2006/0165405 A1* 7/2006 Kanai ................ H04N 5/23203
396/334
2009/0163185 A1* 6/2009 Lim ................... H04N 5/23206
455/414.1
(Continued)

FOREIGN PATENT DOCUMENTS

AU    2013/136876 A1    9/2013
AU    2013233646 A1    9/2013
(Continued)

OTHER PUBLICATIONS

Japanese Office Action dated Aug. 14, 2018 for corresponding Japanese Application No. 2014-265649.
(Continued)

*Primary Examiner* — Kelly L Jerabek
(74) *Attorney, Agent, or Firm* — Michael Best & Friedrich LLP

(57) ABSTRACT

An information processing apparatus (e.g., smart phone), a first external device (e.g., first camera), and a second external device (e.g., second camera), may establish respective wireless communication connections in one of a first communication mode and a second communication mode. In the first communication mode, the information processing apparatus may act as a client device. In the second communication mode, the information processing apparatus may act as a master device. When there is an active communications connection between the information processing apparatus and the first external device in the first communication mode, the information processing apparatus switches from the first communication mode to the second communication mode based on a communications connection being initiated between the second external device and the information processing apparatus.

19 Claims, 6 Drawing Sheets

(51) Int. Cl.
*H04W 76/20* (2018.01)
*G06F 21/43* (2013.01)
*G06F 21/44* (2013.01)
*H04W 12/06* (2009.01)
*H04L 29/06* (2006.01)
*H04W 4/80* (2018.01)
*H04W 84/20* (2009.01)
*H04W 88/04* (2009.01)
*H04W 84/12* (2009.01)

(52) U.S. Cl.
CPC ........ *H04L 63/083* (2013.01); *H04L 63/0876* (2013.01); *H04N 5/23206* (2013.01); *H04N 5/23293* (2013.01); *H04W 12/06* (2013.01); *H04W 76/20* (2018.02); *G06F 2221/2111* (2013.01); *H04W 4/80* (2018.02); *H04W 84/12* (2013.01); *H04W 84/20* (2013.01); *H04W 88/04* (2013.01)

(58) Field of Classification Search
USPC ............................................ 348/211.1–211.3
See application file for complete search history.

(56) References Cited

U.S. PATENT DOCUMENTS

| 2011/0296508 | A1* | 12/2011 | Os | ........................ | G06F 21/445 |
| | | | | | 726/7 |
| 2013/0201353 | A1* | 8/2013 | Koike | .................... | H04N 5/225 |
| | | | | | 348/207.1 |
| 2013/0303128 | A1* | 11/2013 | Wang | .................. | H04L 63/0876 |
| | | | | | 455/411 |
| 2014/0177613 | A1 | 6/2014 | Baker et al. | | |
| 2014/0354837 | A1 | 12/2014 | Okazaki et al. | | |

FOREIGN PATENT DOCUMENTS

| JP | 08-331434 | A | 12/1996 |
| JP | 08-331434 | A | 12/1996 |
| JP | 2011-045026 | A | 3/2011 |
| JP | 2012-217049 | A | 11/2012 |
| JP | 2014-220700 | A | 11/2014 |
| WO | 2013/136876 | A1 | 9/2013 |
| WO | WO-2014/103313 | A1 | 7/2014 |

OTHER PUBLICATIONS

Japanese Office Action dated Apr. 10, 2018 for corresponding Japanese Application No. 2014-265649.
European Patent Office Communication Pursuant to Article 94(3) EPC dated Apr. 11, 2018 for corresponding European Application No. 15 808 213.7.
European Patent Office Communication pursuant to Article 94(3) EPC dated Apr. 11, 2019 for corresponding European Application No. 158022131.

* cited by examiner

[Fig. 1]
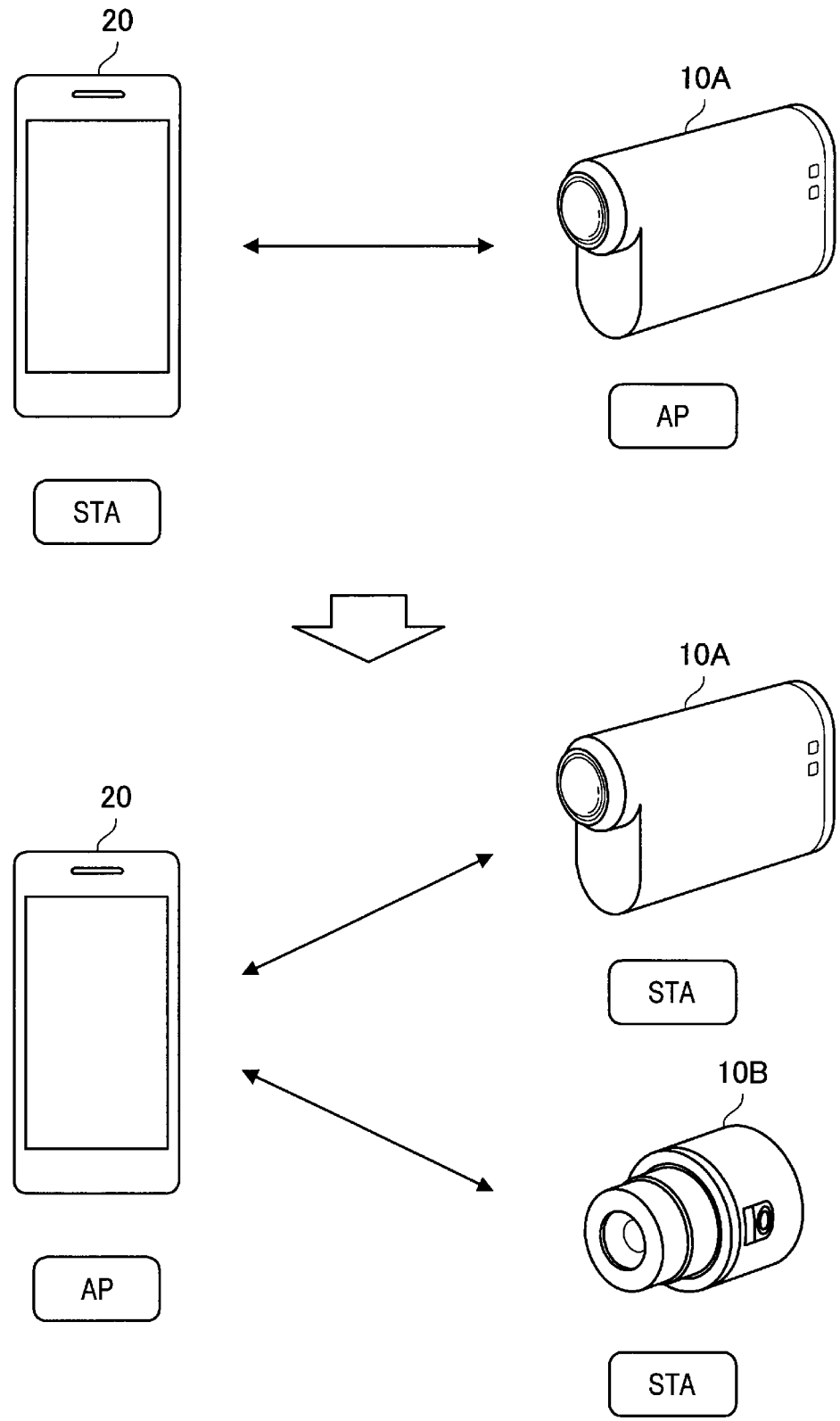

[Fig. 2]
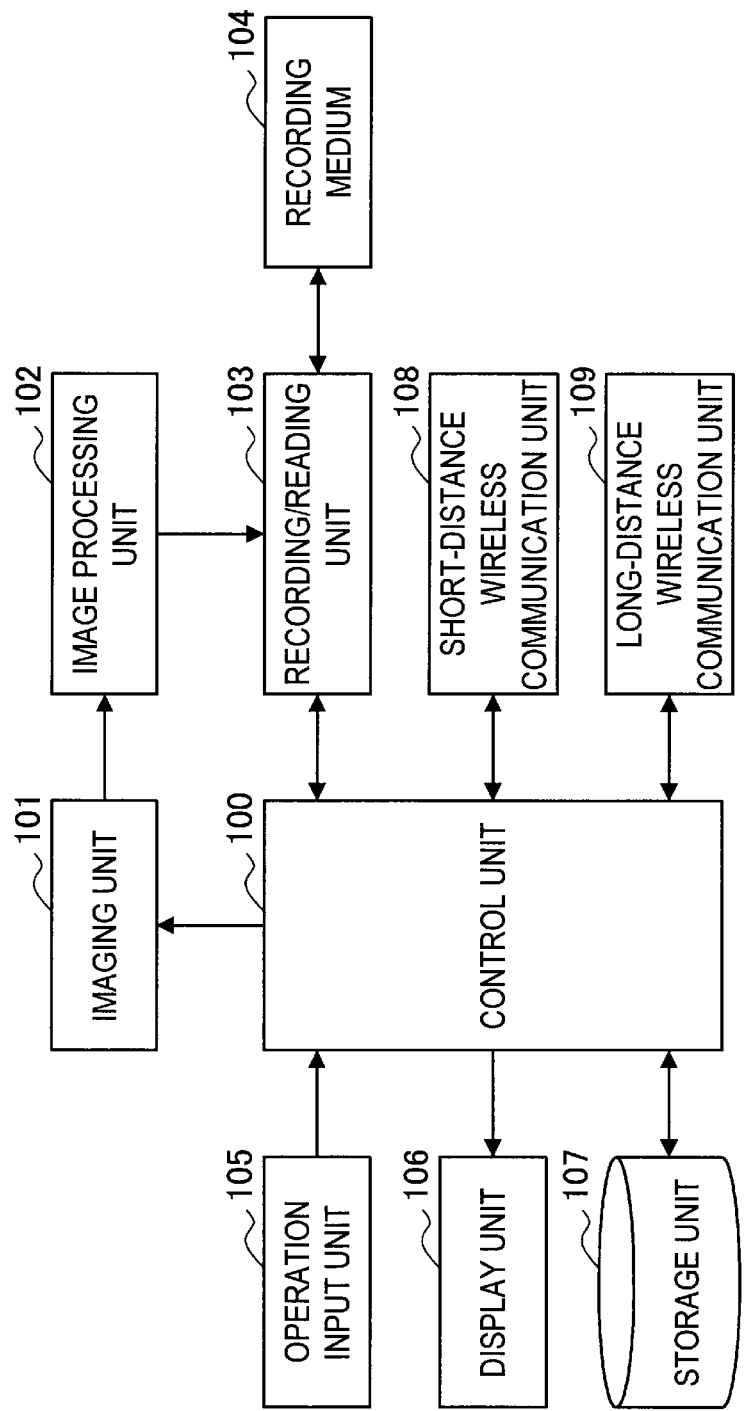

[Fig. 3]
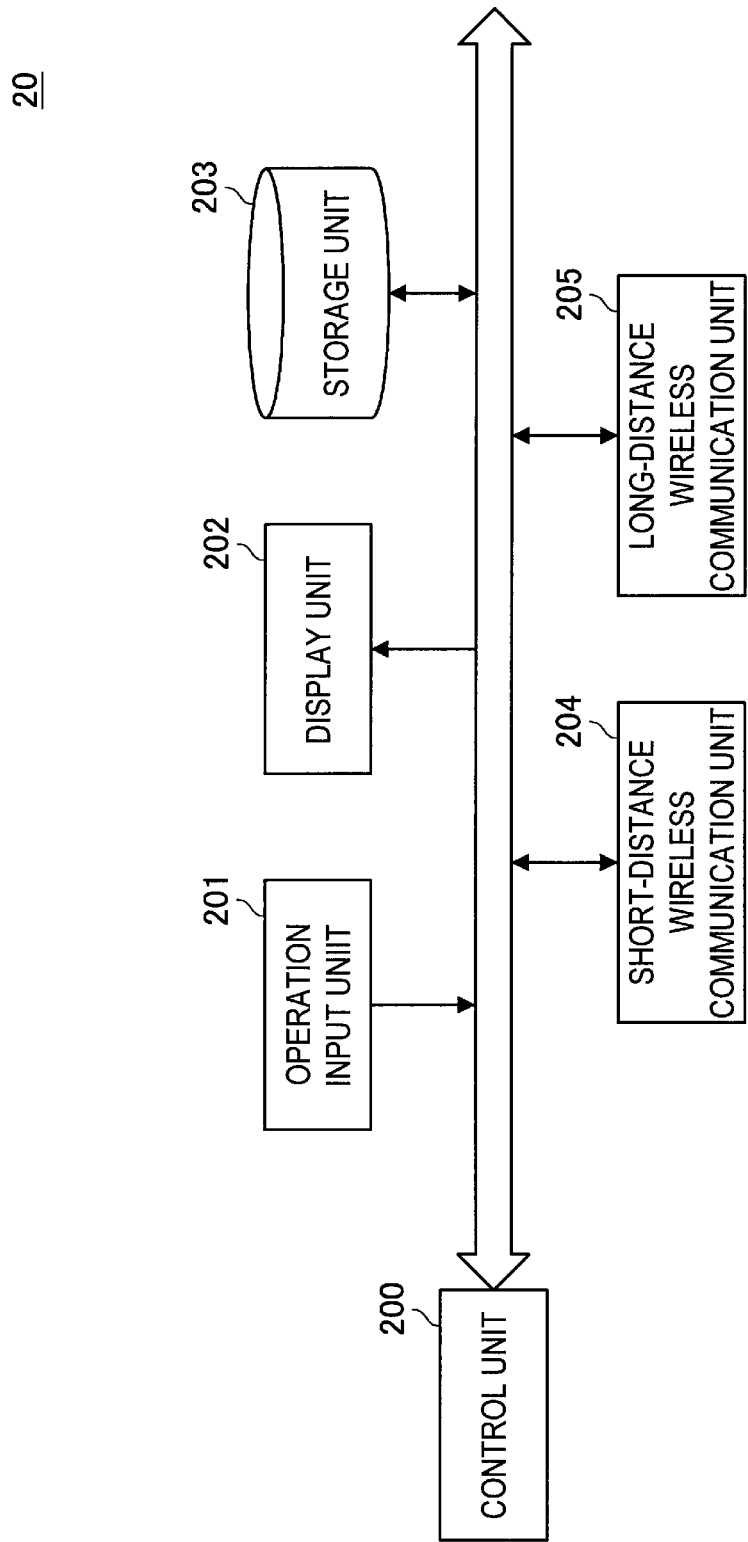

[Fig. 4]
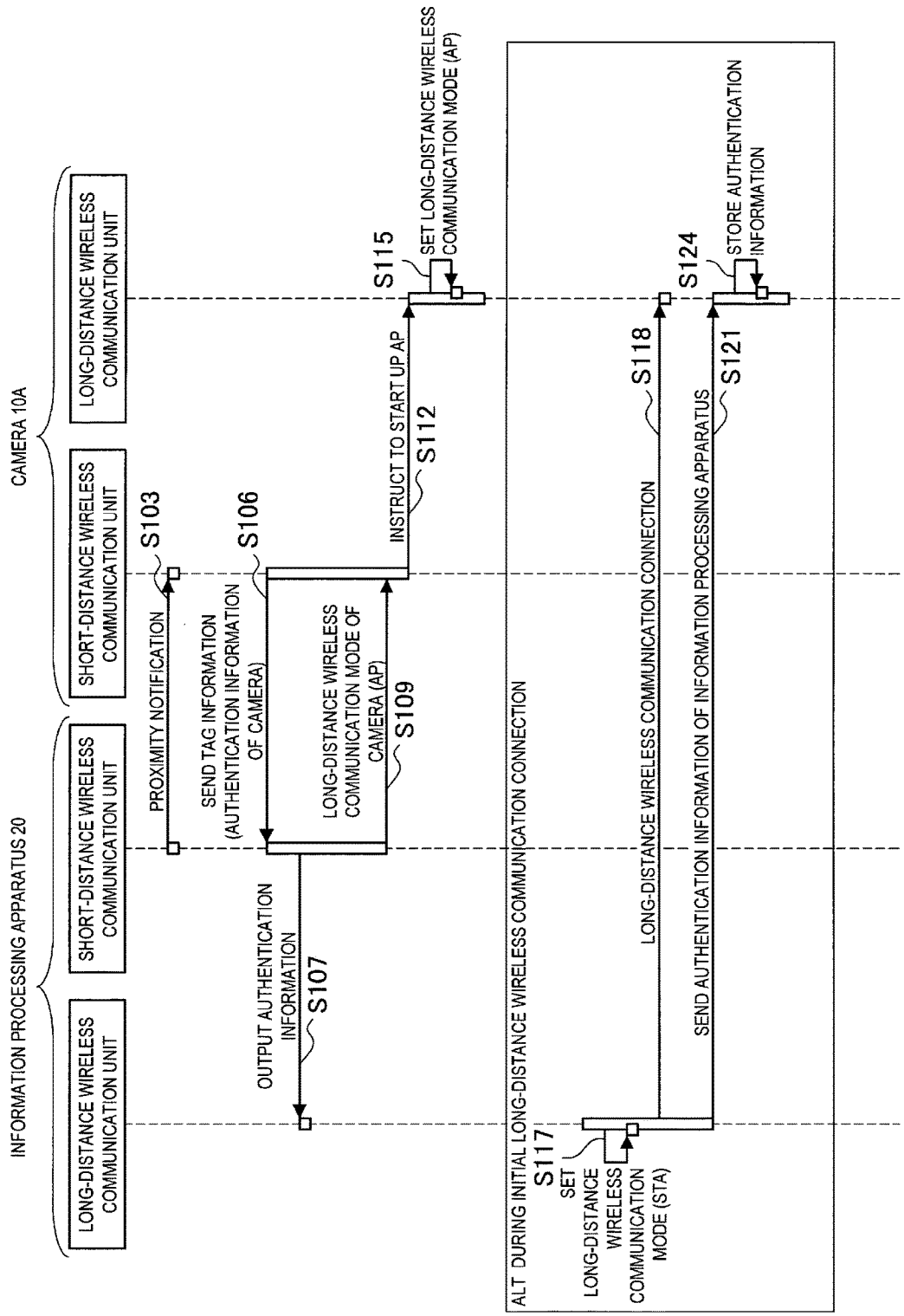

[Fig. 5]
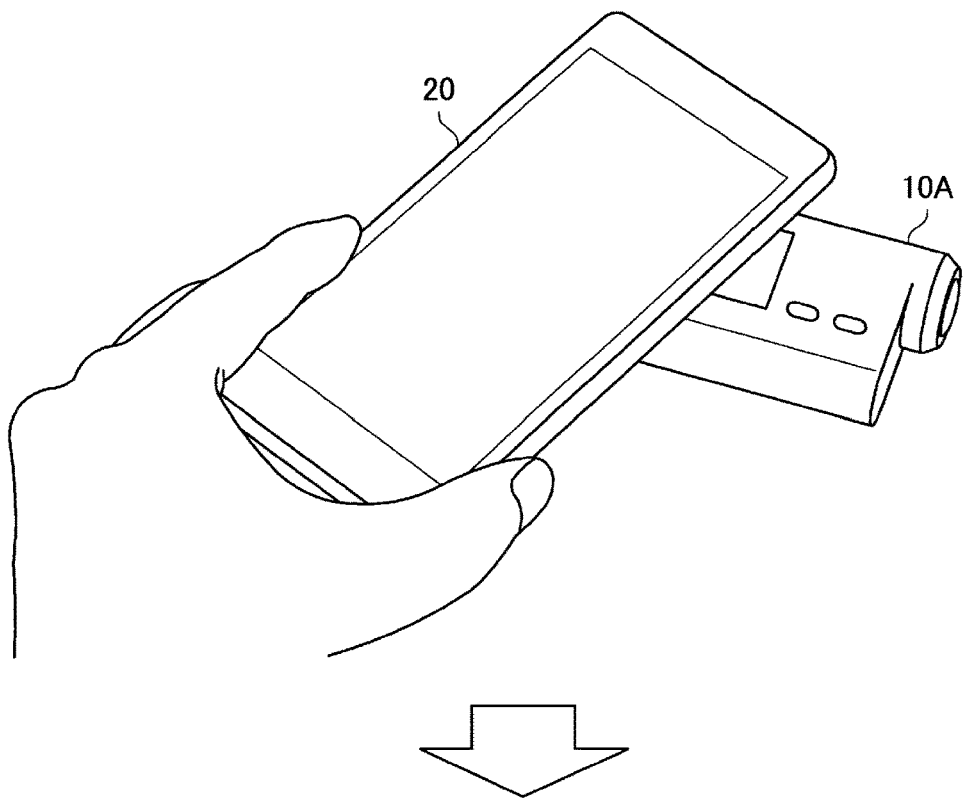
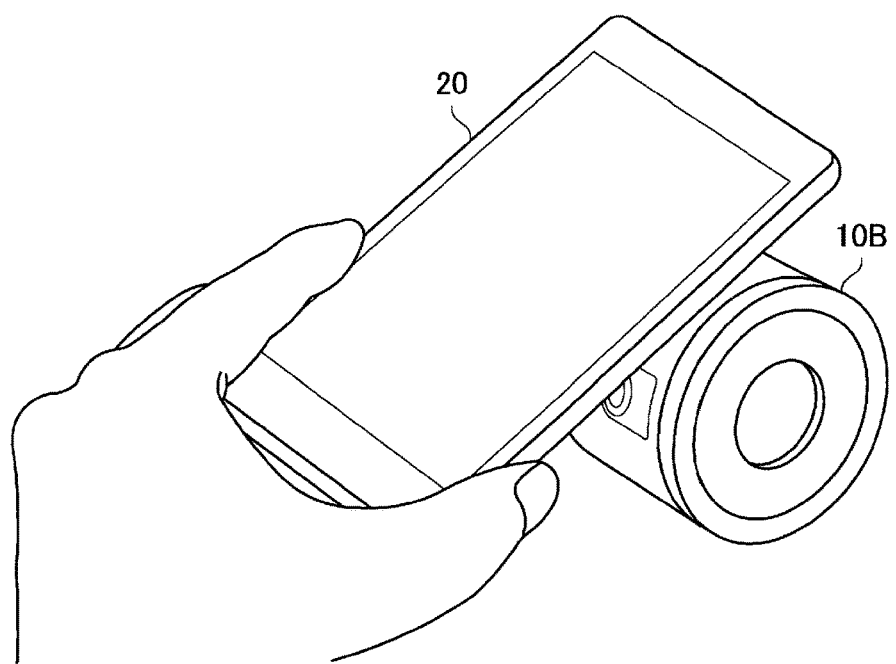

[Fig. 6]
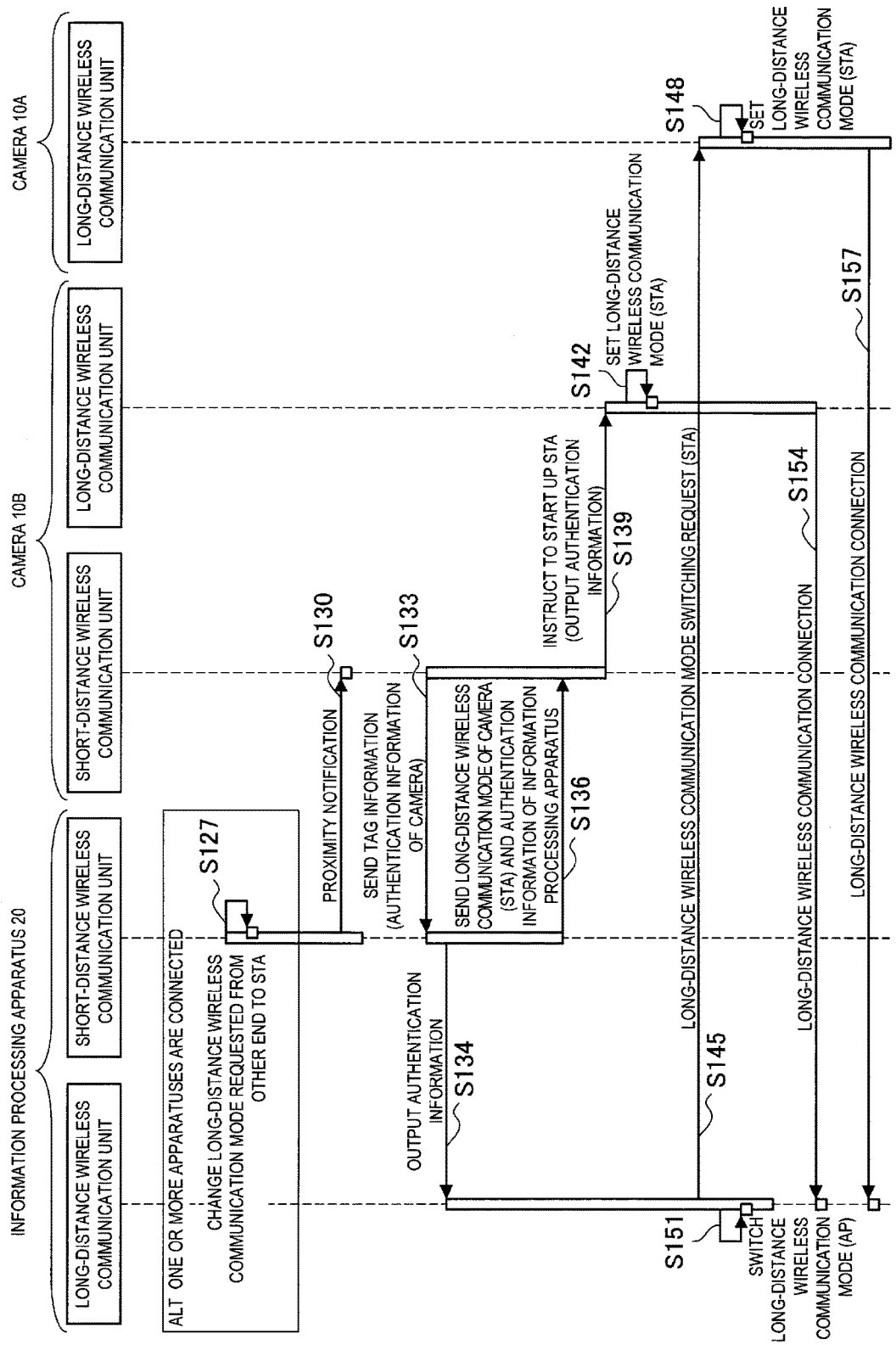

INFORMATION PROCESSING APPARATUS WITH COMMUNICATION MODE SWITCHING, CONTROL METHOD, AND PROGRAM

CROSS REFERENCE TO RELATED APPLICATIONS

This application claims the benefit of Japanese Priority Patent Application JP 2014-265649 filed Dec. 26, 2014, the entire contents of which are incorporated herein by reference.

TECHNICAL FIELD

The present disclosure relates to information processing apparatuses, control methods, and programs.

BACKGROUND ART

Video camera apparatuses that can be remotely controlled have in recent years been proposed. For example, PTL 1 described below has proposed a video camera apparatus that captures an image according to an image capture signal that is sent from a remote controller through wireless communication, and sends a captured image to the remote controller.

Also, a system has been proposed that remotely controls image capture performed by a digital camera using an information processing terminal (a smartphone, mobile telephone terminal, or the like) that includes an application having a function of wirelessly communicating with the digital camera to remotely control image capture.

CITATION LIST

Patent Literature

PTL 1: JP H8-331434A

SUMMARY

Technical Problem

A network through which an information processing terminal used as a remote controller and an apparatus to be remotely controlled are connected together as described above may have a number of forms.

However, it takes time and effort to switch such network forms. For example, it is necessary to input predetermined information or operate manually. No function of easily switching the network forms has been available.

Under such circumstances, an embodiment of the present disclosure proposes an information processing apparatus, control method, and program that can appropriately switch network connection forms with an external apparatus connected.

Solution to Problem

According to a first exemplary illustration of the present disclosure, an information processing apparatus, may include wireless communication circuitry and control circuitry. The wireless communication circuitry may be configured to be capable of establishing respective communication connections with external devices in one of a first communication mode and a second communication mode.

The control circuitry may be configured to cause the wireless communication circuitry to switch between the first communication mode and the second communication mode based on a number of the communication connections with external devices that are active.

According to a second exemplary illustration of the present disclosure, an information processing system may include an information processing apparatus, a first external device, and a second external device. In addition, the information processing system may include wireless communications circuitry that may be configured to be capable of establishing respective communication connections between the information processing apparatus and the first and second external devices in one of a first communication mode and a second communication mode. The wireless communications circuitry may be included in the information processing apparatus, the first external device, the second external device, or in any combination of these. The information processing system may also include control circuitry that may be configured to cause the wireless communications circuitry to, in a state in which one of the communications connections is active between the first external device and the information processing apparatus, switch from the first communication mode to the second communication mode based on one of the communications connections being initiated between the second external device and the information processing apparatus. The control circuitry may be included in the information processing apparatus, the first external device, the second external device, or in any combination of these.

According to a second exemplary illustration of the present disclosure, a method may include establishing a wireless communication connection between an information processing apparatus and a first external device in a first communication mode, then, initiating establishment of a wireless communication connection between the information processing apparatus and a second external device in a second communication mode, and then, causing the information processing apparatus and the first external device to switch to the second communication mode.

Advantageous Effects of Invention

As described above, according to one or more of embodiments of the present disclosure, network connection forms with an external apparatus connected can be appropriately switched.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 1 is a diagram for outlining an information processing system according to an embodiment of the present disclosure.

FIG. 2 is a block diagram showing an example basic configuration of a camera according to this embodiment.

FIG. 3 is a block diagram showing an example basic configuration of an information processing apparatus according to this embodiment.

FIG. 4 is a sequence diagram showing an operation process during connection of a first apparatus in an information processing system according to this embodiment.

FIG. 5 is a diagram for describing proximity notification according to this embodiment.

FIG. 6 is a sequence diagram showing an operation process during connection of a second apparatus in an information processing system according to this embodiment.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Description will be provided in the following order.
1. Overview of information processing system according to embodiment of present disclosure
2. Basic configuration
2-1. Configuration of camera
2-2. Configuration of information processing apparatus
3. Operation process
3-1. Operation process during connection of first apparatus
3-2. Operation process during connection of second apparatus
4. Conclusion 1. Overview of Information Processing System According to Embodiment of Present Disclosure Firstly, an overview of an information processing system according to an embodiment of the present disclosure will be described with reference to FIG. 1. As shown in FIG. 1, the information processing system of this embodiment includes an information processing apparatus 20, and cameras 10A and 10B that are an example of one or more external apparatuses. The information processing apparatus 20 functions as a remote controller that wirelessly communicates with the camera 10 to remotely control image capture performed by the camera 10. This function may be implemented by installing, into the information processing apparatus 20, for example, an application that is produced using an application programming interface (API) for controlling an operation of the camera 10. In other words, the information processing apparatus 20 controls an operation of the camera 10 using an API. More specifically, the information processing apparatus 20 sends control information to the camera 10 to control an operation of the camera 10. Such control information includes, for example, an instruction to the camera 10 to capture an image, sending an image of an object prior to image capture to the information processing apparatus 20 (displaying live view), sending information about a setting of the camera 10 to the information processing apparatus 20 (obtaining a setting value), and changing information about a setting of the camera 10 (changing a setting value).

Thus, the information processing apparatus 20 allows for control of an operation of the camera 10, so that the camera 10 whose input/output interface is limited (e.g., simplified or removed) can be effectively used. For example, the camera 10A is an imaging apparatus that is smaller, lighter, and more robust (e.g., waterproof, dustproof, shock-resistant, low-temperature-resistant, or the like), and therefore, can be attached to a helmet or equipment in a sport (cycling, running, snowboarding, skiing, driving, surfing, diving, or the like) to capture a realistic image of a scene that is seen in the sport, in a handsfree manner. The camera 10B is a lens-type imaging apparatus that is mainly specialized in the imaging lens portion, and therefore, does not have a viewfinder or display, and allows the user to shoot while holding the apparats with a hand at any angle. In the cameras 10A and 10B having such a new style, the operation and display units are simplified or removed for a reduction in size and weight, and therefore, operations such as controlling image capture, changing settings, and the like may be performed using the information processing apparatus 20 that functions as a remote controller. Note that the housings of the cameras 10A and 10B may be configured and allowed to be fixed to other objects, such as a human body, animal, information processing terminal, and the like, with or without an external mounting device (not shown). For example, the cameras 10A and 10B may be configured as a wearable camera.

The information processing apparatus 20 and the camera 10 are connected together using a communication scheme that can connect an apparatus operating as a master access point (AP) and one or more apparatuses operating as a subsidiary station (STA) together based on the standard Wi-Fi (registered trademark), which is an example long-distance wireless communication standard. During an initial connection, an apparatus operating as a subsidiary STA authenticates a connection to an apparatus operating as a master AP using authentication information, such as a service set identifier (SSID) and password for the master AP. The authentication information of a master AP may, for example, be manually input to a subsidiary STA by the user, or read from a tag (NFC tag) provided in the master AP through short-distance wireless communication (e.g., near-field communication (NFC)). Therefore, when, as shown in an upper portion of FIG. 1, the information processing apparatus 20 and the camera 10A are connected together, one-on-one, the information processing apparatus 20 and the camera 10A are controlled so that a communication connection is established where the information processing apparatus 20 operates as a subsidiary STA while the camera 10A operates as a master AP, because it is difficult to input authentication information to the camera 10A whose operation input unit is simplified or removed.

Here, when an apparatus that can be operated using the information processing apparatus 20, which functions as a remote controller, is additionally provided, the information processing apparatus 20 and the cameras 10A and 10B have a one-to-many (multi-connection) relationship. In this case, as shown in a lower portion of FIG. 1, it is necessary to switch a long-distance wireless communication mode of the information processing apparatus 20 from a subsidiary STA to a master AP, and cause the cameras 10A and 10B to operate as a subsidiary STA.

However, to switch the master-subsidiary relationship, it is necessary to input the authentication information of the information processing apparatus 20 to the cameras 10A and 10B and thereby newly perform an authentication process between the information processing apparatus 20 and all the cameras 10A and 10B. Therefore, it takes time and effort for the user to operate. Also, it is difficult for a typical user to understand that, when an apparatus to be operated is added, it is necessary for the user to perform an operation of switching the master-subsidiary relationship, and such an operation confuses the user.

Therefore, in this embodiment, when an apparatus to be operated (i.e., an external apparatus) is added, the master-subsidiary relationship is caused to be appropriately switched, whereby time and effort for the user's operation can be removed. Also, switching of the master-subsidiary relationship and temporary disconnection of long-distance wireless communication due to the switching are not displayed on a user interface (UI) so that the user is not confused.

2. Basic Configuration

Basic configurations of the above-described information processing apparatus 20 and camera 10, which are included in the information processing system of this embodiment, will be specifically described with reference to FIGS. 2 to 4.

<2-1. Configuration of Camera>

FIG. 2 is a block diagram showing an example basic configuration of the camera 10 of this embodiment. As shown in FIG. 2, the camera 10 includes a control unit 100, an imaging unit 101, an image processing unit 102, a recording/reading unit 103, a recording medium 104, an operation input unit 105, a display unit 106, a storage unit 107, a short-distance wireless communication unit 108, and a long-distance wireless communication unit 109. Each of these components may include a circuit. Note that the camera 10, which is an example external apparatus, is implemented as a digital camera having a shape shown in FIG. 1, for example.

(Control Unit)

The control unit 100 includes, for example, a microcomputer including a central processing unit (CPU), a read only memory (ROM), a random access memory (RAM), a nonvolatile memory, and an interface unit. The control unit 100 controls each component included in the camera 10. For example, to allow the camera 10 to perform long-distance wireless communication with the information processing apparatus 20 using the long-distance wireless communication unit 109, the control unit 100 sets the long-distance wireless communication mode so that the camera 10 operates as a master AP or a subsidiary STA. The control unit 100 also controls image capture of the imaging unit 101 according to a control signal from the information processing apparatus 20 connected through long-distance wireless communication.

(Operation Input Unit and Display Unit)

The operation input unit 105 detects the user's operation input, and outputs an operation signal to the control unit 100. The operation input unit 105 may be a button having a physical configuration. The display unit 106 displays an image containing basic apparatus information, such as a battery level, available storage space, time, and the like. Note that, in the camera 10 of this embodiment, the operation input unit 105 and the display unit 106 may be simplified or removed for the reduction of size and weight.

(Imaging Unit)

The imaging unit 101, which is a signal conversion unit, such as a charge coupled device (CCD), complementary metal oxide semiconductor (CMOS), or the like, forms an image of an object using an optical system. An image of an object that is formed in the signal conversion unit is converted into an electrical image signal by the signal conversion unit. The image signal (captured image) obtained by the conversion performed by the imaging unit 101 is sent to the recording medium 104 through the image processing unit 102 and the recording/reading unit 103.

(Image Processing Unit)

The image processing unit 102 processes the image signal (captured image) output from the imaging unit 101. The image processing unit 102 performs, for example, noise removal, color tone correction, edge detection, or the like when necessary. The image processing unit 102 also outputs the image signal (captured image) output from the imaging unit 101 to the recording/reading unit 103.

(Recording/Reading Unit)

The recording/reading unit 103 records the image signal (captured image) output from the image processing unit 102 to the recording medium 104, or reads the captured image recorded in the recording medium 104. The recording/reading unit 103 may compress the captured image and records the compressed image to the recording medium 104. The recording/reading unit 103, when reading the compressed data from the recording medium 104, decompresses the data and outputs the decompressed data.

(Recording Medium)

The recording medium 104 is, for example, a memory card to which the captured image is written.

(Storage Unit)

The storage unit 107 is a recording medium including a random access memory (RAM), a read only memory (ROM), and the like. The RAM is used as a working area for the control unit 100, for example. The ROM stores a program for causing the control unit 100 to perform each control.

(Short-Distance Wireless Communication Unit)

The short-distance wireless communication unit 108 is an interface that performs short-distance wireless communication with the information processing apparatus 20 located close thereto, in cooperation with a short-distance radio antenna, under the control of the control unit 100. The short-distance wireless communication unit 108 may, for example, be an NFC communication unit. The NFC communication unit emits radio waves that can reach proximity, i.e., a distance of about 3 to 10 cm, or about 7 mm in some designs, from the NFC antenna, in cooperation with the NFC antenna, to perform short-distance wireless communication with the information processing apparatus 20 that is located within the radio coverage. The short-distance wireless communication unit 108 also sends an SSID and a password (an example encryption key), as authentication information used in authentication of a long-distance wireless communication connection, according to a command from the information processing apparatus 20.

(Long-Distance Wireless Communication Unit)

The long-distance wireless communication unit 109 is an interface that wirelessly communicates with the information processing apparatus 20 located therearound, in cooperation with a long-distance radio antenna, under the control of the control unit 100. The long-distance wireless communication unit 109 performs communication over a longer communication distance than that of the short-distance wireless communication unit 108. The long-distance wireless communication unit 109 may, for example, be a Wi-Fi communication unit. The long-distance wireless communication unit 109 also performs a process of establishing a long-distance wireless communication connection with the information processing apparatus 20 by performing authentication for long-distance wireless communication in response to a long-distance wireless communication connection request from the information processing apparatus 20. The long-distance wireless communication unit 109 also sets the long-distance wireless communication mode so that the camera 10 operates as a master AP or a subsidiary STA, under the control of the control unit 100. A remote control from the information processing apparatus 20 after setting of a network form is performed mainly through long-distance wireless communication.

A basic configuration of the camera 10 of this embodiment has been specifically described above. Next, a basic configuration of the information processing apparatus 20 of this embodiment will be specifically described with reference to FIG. 3.

<2-2. Configuration of Information Processing Apparatus>

FIG. 3 is a block diagram showing an example basic configuration of the information processing apparatus 20. As shown in FIG. 3, the information processing apparatus 20 includes a control unit 200, an operation input unit 201, a display unit 202, a storage unit 203, a short-distance wireless communication unit 204, and a long-distance wireless communication unit 205. Note that the information processing apparatus 20 may, for example, be implemented as a smartphone as shown in FIG. 1, or as a tablet terminal or a wearable device, such as smartglasses, a smartwatch, or the like.

(Control Unit)

The control unit 200 includes, for example, a microcomputer including a CPU, a ROM, a RAM, a non-volatile memory, and an interface unit. The control unit 200 controls each component included in the information processing apparatus 20. For example, to allow the information processing apparatus 20 to perform long-distance wireless communication with an external apparatus through the long-distance wireless communication unit 205, the control unit 200 sets the long-distance wireless communication mode so that the information processing apparatus 20 operates as a master AP or a subsidiary STA. The control unit 200 also functions as a remote controller for the external apparatus connected through long-distance wireless communication, to control the external apparatus according to the user's operation detected by the operation input unit 201, for example.

(Operation Input Unit)

The operation input unit 201 detects the user's operation input, and outputs an operation signal to the control unit 200. The operation input unit 201 may be a button having a physical configuration (e.g., a power button), or a touch panel for detecting a touch operation to an operation screen.

(Display Unit)

The display unit 202 displays a menu screen, remote controller screen, authentication information input screen, or the like. The display unit 202 is, for example, implemented as a display device, such as a liquid crystal display (LCD) device, organic light emitting diode (OLED) device, or the like.

(Storage Unit)

The storage unit 203 is a recording medium including a RAM, a ROM, and the like. The RAM is used as a working area for the control unit 200, for example. The ROM stores a program for causing the control unit 200 to perform each control.

(Short-Distance Wireless Communication Unit)

The short-distance wireless communication unit 204 is an interface that performs short-distance wireless communication with an external apparatus (e.g., the camera 10) located close thereto, in cooperation with a short-distance radio antenna, under the control of the control unit 200. The short-distance wireless communication unit 204 may, for example, be an NFC communication unit. The short-distance wireless communication unit 204 of this embodiment receives authentication information used in authentication of a long-distance wireless communication connection (e.g., an SSID and a password (an example encryption key)) from the camera 10.

(Long-Distance Wireless Communication Unit)

The long-distance wireless communication unit 205 is an interface that wirelessly communicates with an external apparatus (e.g., the camera 10) located therearound, in cooperation with a long-distance radio antenna, under the control of the control unit 200. The long-distance wireless communication unit 205 performs communication over a longer communication distance than that of the short-distance wireless communication unit 204. The long-distance wireless communication unit 205 may, for example, be a Wi-Fi communication unit. The long-distance wireless communication unit 205 also performs a process of establishing a long-distance wireless communication connection with the camera 10 by performing long-distance wireless communication authentication using authentication information obtained from the camera 10. The long-distance wireless communication unit 205 also sets the long-distance wireless communication mode so that the information processing apparatus 20 operates as a master AP or a subsidiary STA, under the control of the control unit 200. A remote control from the information processing apparatus 20 after setting of a network form is performed mainly through long-distance wireless communication.

A basic configuration of the information processing apparatus 20 of this embodiment has been specifically described above. Next, an operation process of the information processing system of this embodiment will be described.

3. Operation Process

As described with reference to FIG. 1, in the information processing system of this embodiment, when the information processing apparatus 20 and the camera 10 are connected together, one-on-one, the information processing apparatus 20 is caused to operate as a subsidiary STA while the camera 10 is caused to operate as a master AP. On the other hand, when an apparatus to be operated is added, the information processing system causes the information processing apparatus 20 to operate as a master AP and causes a plurality of cameras 10 to operate as a subsidiary STA in order to establish one-to-many connection (multiple connections). Thus, the information processing apparatus 20 switches its wireless communication mode based on a number of the communication connections with cameras 10 that are active. In particular, when no more than one communication connection with a camera 10 is active, the information processing apparatus 20 operates in a first communication mode (subsidiary STA), and when a second communication connection with a camera 10 is initiated (for example, by detecting a proximity notification) the information processing apparatus 20 switches to a second communication mode (AP). In the description that follows, an operation process that is performed when the information processing apparatus 20 is connected to a first camera 10A, one-on-one, will be firstly described.

<3-1. Operation Process during Connection of First Apparatus>

FIG. 4 is a sequence diagram showing an operation process during connection of a first apparatus in the information processing system of this embodiment. As shown in FIG. 4, initially, in step S103, when the information processing apparatus 20 is put close to the camera 10A, the short-distance wireless communication unit 108 of the camera 10A (hereinafter referred to as the short-distance wireless communication unit 108A) detects proximity notification from the short-distance wireless communication unit 204 of the information processing apparatus 20. Specifically, as shown in an upper portion of FIG. 5, when the user puts an apparatus to be operated (e.g., the camera 10A) that the user desires to connect to the information processing apparatus 20 (it is not always necessary to touch that apparatus to the information processing apparatus 20), the short-distance wireless communication unit 108A of the camera 10A detects a command emitted from the short-distance wireless communication unit 204 of the information processing apparatus 20.

Next, in step S106, the short-distance wireless communication unit 108A of the camera 10A returns a command response based on the detection of the command. The command response contains, for example, authentication information (e.g., an SSID and a password) of the camera 10A as NFC tag information of the camera 10A. The information processing apparatus 20 uses the authentication information in order to establish a long-distance wireless connection with the camera 10A where the camera 10A operates as a master AP.

Next, in step S107, the short-distance wireless communication unit 204 outputs the obtained authentication information of the camera 10A to the long-distance wireless communication unit 205.

Next, in step S109, the short-distance wireless communication unit 204 of the information processing apparatus 20 requests the camera 10A to set the long-distance wireless communication mode to a master AP.

Next, in step S112, the short-distance wireless communication unit 108A of the camera 10A instructs the long-distance wireless communication unit 109 (hereinafter referred to as the long-distance wireless communication unit 109A) to start up a master AP, according to the request from the information processing apparatus 20.

Next, in step S115, the long-distance wireless communication unit 109A of the camera 10A sets the long-distance wireless communication mode so that the camera 10A operates as a master AP.

On the other hand, in step S117, the long-distance wireless communication unit 205 of the information processing apparatus 20 sets the long-distance wireless communication mode so that the information processing apparatus 20 operates as a subsidiary STA.

Next, in step S118, the long-distance wireless communication unit 205 of the information processing apparatus 20 uses the authentication information of the camera 10A obtained by the short-distance wireless communication unit 204 in step S106, to send a long-distance wireless communication connection request to the camera 10A and thereby establish a long-distance wireless communication connection where the camera 10A operates as a master AP. In this embodiment, during an initial long-distance wireless communication connection with the first apparatus, a network having a master-subsidiary relationship is constructed in which the information processing apparatus 20 operates as a subsidiary STA while the camera 10A operates as a master AP. After construction of such a network, the information processing apparatus 20 remotely controls the camera 10A. Specifically, the information processing apparatus 20 sends control information to the camera 10A through long-distance wireless communication to control an operation of the camera 10A.

Next, in step S121, the information processing apparatus 20 sends authentication information (e.g., an SSID and a password) of the information processing apparatus 20 to the camera 10A through the long-distance wireless communication connection established between the information processing apparatus 20 and the camera 10A. The authentication information is one that is necessary in the camera 10A when the information processing apparatus 20 switches the master-subsidiary relationship of the long-distance wireless communication connection to establish a long-distance wireless communication connection where the information processing apparatus 20 operates as a master AP.

Thereafter, in step S124, the long-distance wireless communication unit 108A of the camera 10A stores the authentication information received from the information processing apparatus 20.

Thus, in this embodiment, during an initial long-distance wireless communication connection, if authentication information of the information processing apparatus 20 which is necessary for switching the master-subsidiary relationship of the long-distance wireless communication connection (multiple connections) is previously sent to the camera 10A, the master-subsidiary relationship can be appropriately switched in the multi-connection state. Next, an operation process during connection of a second apparatus will be described with reference to FIG. 6.

<3-2. Operation Process during Connection of Second Apparatus>

FIG. 6 is a sequence diagram showing an operation process during connection of a second apparatus in the information processing system of this embodiment. As shown in FIG. 6, initially, in step S127, when a long-distance wireless communication connection has been established between the information processing apparatus 20 and one or more external apparatuses, the short-distance wireless communication unit 204 of the information processing apparatus 20 changes the setting of the long-distance wireless communication mode which the information processing apparatus 20 requests the external apparatuses to set, to a subsidiary STA. Here, as shown in step S118 of FIG. 4, the information processing apparatus 20 has established a long-distance wireless communication connection with the camera 10A, and thus, is currently connected to one or more apparatuses. Such a connection allows the information processing apparatus 20 to remotely control the camera 10A.

Next, in step S130, when the camera 10B is put close to the information processing apparatus 20, the short-distance wireless communication unit 108 of the camera 10B (hereinafter referred to as the short-distance wireless communication unit 108B) detects proximity notification from the short-distance wireless communication unit 204 of the information processing apparatus 20. Specifically, as shown in a lower portion of FIG. 5, when the user puts the information processing apparatus 20 close to a second apparatus to be operated (e.g., the camera 10B) that the user desires to additionally connect to the information processing apparatus 20 (it is not always necessary to touch the information processing apparatus 20 to the second apparatus to be operated), the short-distance wireless communication unit 108B of the camera 10B detects a command emitted from the short-distance wireless communication unit 204 of the information processing apparatus 20.

Next, in step S133, the short-distance wireless communication unit 108B of the camera 10B returns a command response based on the detection of the command. The command response contains, for example, authentication information (e.g., an SSID and a password) of the camera 10B as NFC tag information of the camera 10B.

Next, in step S134, the short-distance wireless communication unit 204 outputs the obtained authentication information of the camera 10B to the long-distance wireless communication unit 205. The information processing apparatus 20 can recognize that the user is trying to add an apparatus to be operated, based on the situation that the short-distance wireless communication unit 204 has had NFC communication with the second camera 10B.

Next, in step S136, the short-distance wireless communication unit 204 of the information processing apparatus 20 requests the camera 10B to set the long-distance wireless communication mode to a subsidiary STA, and sends authentication information of the information processing apparatus 20 to the camera 10B. The authentication information is one that is necessary in the camera 10B for establishing a long-distance wireless communication connection where the information processing apparatus 20 operates as a master AP. The information processing apparatus 20 of this embodiment sends the authentication information of the information processing apparatus 20 to the second and following apparatuses through NFC communication.

Next, in step S139, the short-distance wireless communication unit 108B of the camera 10B instructs the long-distance wireless communication unit 109 (hereinafter referred to as the long-distance wireless communication unit 109B) to start up a subsidiary STA, according to the request from the information processing apparatus 20. At this time, the short-distance wireless communication unit 108B outputs the authentication information sent from the information processing apparatus 20 to the long-distance wireless communication unit 109B.

Next, in step S142, the long-distance wireless communication unit 109B of the camera 10B sets the long-distance wireless communication mode so that the camera 10B operates as a subsidiary STA.

On the other hand, in step S145, as described above, the long-distance wireless communication unit 205 of the information processing apparatus 20 recognizes that the user is trying to add an apparatus to be operated, based on the situation that the short-distance wireless communication unit 205 has had NFC communication with the second camera 10B, and requests the camera 10A that has already established a connection, to switch the long-distance wireless communication mode. Specifically, the long-distance wireless communication unit 205 of the information processing apparatus 20 requests the camera 10A that is operating as a master AP to switch the master-subsidiary relationship so that the camera 10A operates as a subsidiary STA. When the information processing apparatus 20 is connected to an external apparatus, one-on-one, the information processing apparatus 20 operates as a subsidiary STA. In the case of a one-to-many connection, the information processing apparatus 20 operates as a master AP, and therefore, it is necessary to switch the master-subsidiary relationship between the information processing apparatus 20 and the camera 10A that have already been connected together (the master-subsidiary relationship in which the information processing apparatus 20 is a subsidiary STA while the camera 10A is a master AP).

Next, in step S148, the long-distance wireless communication unit 109A of the camera 10A sets the long-distance wireless communication mode so that the camera 10A operates as a subsidiary STA.

Next, in step S151, the long-distance wireless communication unit 205 of the information processing apparatus 20 sets the long-distance wireless communication mode so that the information processing apparatus 20 operates as a master AP. During such switching of the long-distance wireless communication mode, although the long-distance wireless communication connection between the information processing apparatus 20 and the camera 10A is disconnected, the display unit 202 of the information processing apparatus 20 and the display unit 106 of the camera 10 do not display information about the switching of the master-subsidiary relationship or the disconnection, and instead, display information indicating that the information processing apparatus 20 and the camera 10 are communicating with each other. This avoids the situation that the user is confused.

Next, in step S154, the long-distance wireless communication unit 109B of the camera 10B performs authentication using the authentication information of the information processing apparatus 20 obtained by the short-distance wireless communication unit 108B in step S139, to establish a communication connection where the information processing apparatus 20 operates as a master AP.

Thereafter, in step S157, the long-distance wireless communication unit 109A of the camera 10A sends a long-distance wireless communication connection request to the information processing apparatus 20 to establish a communication connection. At this time, the long-distance wireless communication unit 109A performs authentication using the stored authentication information of the information processing apparatus 20 that has been received from the information processing apparatus 20 during an initial connection (steps S121 and S124), to establish a communication connection where the information processing apparatus 20 operates as a master AP. After construction of the networks in the respective steps S154 and S157, the information processing apparatus 20 remotely controls the cameras 10A and 10B. Specifically, the information processing apparatus 20 sends control information to the cameras 10A and 10B through long-distance wireless communication to control an operation of each of the cameras 10A and 10B.

Thus, in this embodiment, when the information processing apparatus 20 is connected to the second apparatus, the master-subsidiary relationship in the previous long-distance wireless communication connection between the information processing apparatus 20 and the first camera 10A can be switched. Specifically, the camera 10A has already obtained authentication information of the information processing apparatus 20 through a long-distance wireless communication connection during an initial connection to the information processing apparatus 20. Therefore, the master-subsidiary relationship can be switched without the need of the user's input of authentication information or the like. Also, when the master-subsidiary relationship is switched, the display unit 202 of the information processing apparatus 20 and the display unit 106 of the camera 10 do not display information indicating that the master-subsidiary relationship is being switched, and instead, display information indicating that the information processing apparatus 20 and the camera 10 are communicating with each other. Thus, the display of an operation that cannot be intuitively recognized by the user is avoided.

4. Conclusion

As described above, according to the information processing system of this embodiment, if authentication information of the information processing apparatus 20 that is necessary in an external apparatus (e.g., the camera 10) during a one-to-many connection (multiple connections) has already been sent during a one-to-one connection (single connection), it is no longer necessary to input the authentication information and the master-subsidiary relationship can be appropriately switched during the multiple connections.

It should be understood by those skilled in the art that various modifications, combinations, sub-combinations and alterations may occur depending on design requirements and other factors insofar as they are within the scope of the appended claims or the equivalents thereof.

For example, a computer program for causing hardware, such as a CPU, ROM, and RAM, etc., included in the information processing apparatus 20 or the camera 10 to have the functionality of the information processing apparatus 20 or the camera 10, can be produced. A computer-readable storage medium storing the computer program is also provided.

Also, the steps of the operation process of the information processing system described herein do not necessarily have to be executed in time series in the order described in the accompanying flowchart or sequence diagram. For example, the steps of the operation process of the information processing system may be executed in an order different from the order described in the flowchart or sequence diagram, or may be executed in parallel. Specifically, for example, step S107 and steps S109 to S115 shown in FIG. 4 may be executed in parallel or in the reverse order. Also, steps S154 and S157 shown in FIG. 6 may be executed in parallel or in the reverse order.

Although, in the above embodiment, authentication information necessary during multiple connections is sent to the camera 10 through long-distance wireless communication during an initial connection (single connection) (see step S121), the present disclosure is not limited to this. Alternatively, such authentication information may be sent to the camera 10 through short-distance wireless communication. For example, the information processing apparatus 20 sends the authentication information along with the mode setting request in step S109.

Alternatively, the camera 10 of the present disclosure may previously perform authentication for multiple connections using the authentication information that has been received from the information processing apparatus 20 during an initial connection. In this case, it is no longer necessary to perform authentication during switching of the master-subsidiary relationship in a long-distance wireless communication connection.

In the short-distance wireless communication of this embodiment, in addition to NFC communication, for example, wireless communication that has a shorter communication distance than that of long-distance wireless communication and can provide a connection without authentication, such as Bluetooth (registered trademark), TransferJet, and the like, may be used. In long-distance wireless communication, a hand-held communication network (4G, etc.) may be used in addition to Wi-Fi, which is mentioned above. When the short-distance wireless communication is NFC or TransferJet, the long-distance wireless communication may be Bluetooth (registered trademark).

Although, in the above embodiments, a camera (digital camera) is employed as an apparatus to be operated (i.e., an example external apparatus) in a case where the information processing apparatus 20 functions as a remote controller, the present disclosure is not limited to this. For example, an external apparatus to be remotely controlled by the information processing apparatus 20 may be a drone (flying object), robot, sensor terminal, or the like.

In addition, the effects described in the present specification are merely illustrative and demonstrative, and not limitative. In other words, the technology according to an embodiment of the present disclosure can exhibit other effects that are evident to those skilled in the art along with or instead of the effects based on the present specification.

The present disclosure may be implemented by at least the following configurations:

(1) An information processing apparatus, comprising:
wireless communication circuitry configured to be capable of establishing respective communication connections with external devices in one of a first communication mode and a second communication mode; and
control circuitry configured to cause the wireless communication circuitry to switch between the first communication mode and the second communication mode based on a number of the communication connections with external devices that are active.

(2) The information processing apparatus of (1),
wherein the control circuitry is configured to cause the wireless communication circuitry to:
use the first communication mode when no more than one of the communication connections is active; and
use the second communication mode when two of the communication connections are active.

(3) The information processing apparatus of any one of (1) and (2),
wherein in the first communication mode the information processing apparatus acts as a client device, and
in the second communication mode the information processing apparatus acts as a master device.

(4) The information processing apparatus of any one of (1) through (3),
wherein the control circuitry causes the wireless communication circuitry to, in a state in which one of the communication connections is active with a first external device of the external devices, switch from the first communication mode to the second communication mode in response to one of the communication connections being initiated with a second external device of the external devices.

(5) The information processing apparatus of any one of (1) through (4),
wherein the communication connection with the second external device is initiated as a result of the second external device being brought into close proximity of the information processing apparatus.

(6) The information processing apparatus of any one of (1) through (5),
wherein the control circuitry causes the wireless communication circuitry to, in response to the communication connection being initiated with the second external device, transmit a command to the first external device for the first external device to switch to the second communication mode.

(7) The information processing apparatus of any one of (1) through (6), further comprising:
short-range wireless communication circuitry configured to:
automatically detect the second external device when proximate thereto, and
upon detecting the second external device, exchange authentication information with the second external device, the authentication information being for establishing the communication connection with the second external device.

(8) The information processing apparatus of any one of (1) through (7),
wherein the exchange of the authentication information with the second external device initiates the communication connection with the second external device.

(9) The information processing apparatus of any one of (1) through (4), further comprising:
a display circuitry,
wherein the switching of the wireless communication circuitry from the first communication mode to the second communication mode includes temporarily disconnecting the communication connection with the first external device, and
the control circuitry causes the display circuitry to, while the wireless communication circuitry is switching from the first communication mode to the second communication mode:
display information indicating that the information processing apparatus and the first external device are communicating with each other, and
not display information indicating that the communication connection with the first external device is temporarily disconnected.

(10) The information processing apparatus of any one of (1) through (9),
wherein the wireless communication circuitry includes long range wireless communication circuitry and short range wireless communication circuitry.

(11) An information processing apparatus, comprising:
wireless communication circuitry configured to be capable of establishing respective communication connections with external devices in one of a first communication mode and a second communication mode; and
control circuitry configured to cause the wireless communication circuitry to switch between the first communication mode and the second communication mode based on a predetermined condition being met.

(12) The information processing apparatus of (11),
wherein the predetermined condition is met when there is at least one of the commuication connections that is active and establishment of a second one of the communications connections is initiated.

(13) The information processing apparatus of any one of (11) and (12),
wherein the predetermined condition is met when one of the external devices is brought into close proximity of the information processing apparatus

(14) An information processing system comprising:
an information processing apparatus;
a first external device; and
a second external device,
wherein the information processing system includes wireless communications circuitry that is configured to be capable of establishing respective communication connections between the information processing apparatus and the first and second external devices in one of a first communication mode and a second communication mode, and
the information processing system includes control circuitry that is configured to cause the wireless communications circuitry to, in a state in which one of the communications connections is active between the first external device and the information processing apparatus, switch from the first communication mode to the second communication mode based on one of the communications connections being initiated between the second external device and the information processing apparatus.

(15) The information processing system of (14),
wherein the control circuitry is included in the information processing apparatus and is configured to cause the wireless communications circuitry to switch between the first communication mode and the second communication mode by generating instructions to operate in the second communication mode that are transmitted from the information processing apparatus to the first and second external devices.

(16) The information processing system of any one of (14) and (15),
wherein in the first communication mode the information processing apparatus acts as a client device, and
in the second communication mode the information processing apparatus acts as a master device.

(17) The information processing system of any one of (14) through (16),
wherein the communication connection between the second external device and the information processing apparatus is initiated as a result of the second external device being brought into close proximity of the information processing apparatus.

(18) The information processing system of any one of (14) through (17),
wherein the information processing apparatus includes short-range wireless communication circuitry configured to:
automatically detect the second external device when proximate thereto, and upon detecting the second external device, exchange authentication information with the second external device, the authentication information being for establishing the communication connection between the second external device and the information processing apparatus, and
wherein the exchange of the authentication information with the second external device initiates the communication connection between the second external device and the information processing apparatus.

(19) A method, comprising:
establishing a wireless communication connection between an information processing apparatus and a first external device in a first communication mode,
initiating establishment of a wireless communication connection between the information processing apparatus and a second external device in a second communication mode, and
causing the information processing apparatus and the first external device to switch to the second communication mode.

(20) The method of (19), further comprising:
wherein the initiating establishment of the wireless communication connection between the information processing apparatus and a second external device is performed in response to the second external device being brought into close proximity to the information processing apparatus.

(21) An information processing apparatus including:
a long-distance wireless communication unit configured to perform long-distance wireless communication with an external apparatus; and
a control unit configured to perform a control so that, when the long-distance wireless communication unit has established a first communication mode in which the external apparatus operates as a master apparatus, authentication information of the information processing apparatus for establishing a second communication mode in which the external apparatus operates as a subsidiary apparatus, is sent to the external apparatus.

(22) The information processing apparatus according to (21), further including:
a short-distance wireless communication unit configured to perform short-distance wireless communication with the external apparatus, wherein when the short-distance wireless communication unit has detected a first external apparatus, the information processing apparatus obtains authentication information of the first external apparatus, and wherein the control unit performs a control using the authentication information so that the long-distance wireless communication unit establishes the first communication mode in which the first external apparatus operates as a master apparatus.

(23) The information processing apparatus according to (22), wherein the control unit performs a control so that, when the short-distance wireless communication unit has detected a second external apparatus, authentication information of the information processing apparatus for causing the long-distance wireless communication unit to establish a second communication mode in which the second external apparatus operates as a subsidiary apparatus, is sent to the second external apparatus.

(24) The information processing apparatus according to (23), wherein the control unit, when the second external apparatus has been detected, instructs the first external apparatus to switch a communication mode with the first external apparatus in which the long-distance wireless communication unit has already established the first communication mode, to the second communication mode.

(25) The information processing apparatus according to any one of (22) to (24), wherein the control unit performs a control so that the authentication information of the information processing apparatus is sent from the long-distance wireless communication unit.

(26) The information processing apparatus according to any one of (22) to (24), wherein the control unit performs a control so that the authentication information of the information processing apparatus is sent from the short-distance wireless communication unit.

(27) The information processing apparatus according to any one of (22) to (26), wherein when the short-distance wireless communication unit is located close to the external apparatus at a communication distance shorter than a communication distance of the long-distance wireless communication unit, the short-distance wireless communication unit is allowed to communicate with the external apparatus without an authentication process.

(28) The information processing apparatus according to any one of (21) to (27), wherein the authentication information includes identification information and pass information for identifying the information processing apparatus.

(29) The information processing apparatus according to any one of (21) to (28), wherein the control unit sends a control signal to the external apparatus after establishment of a communication mode.

(30) The information processing apparatus according to (29), wherein the control unit obtains or changes a setting value of the external apparatus according to the control signal.

(31) The information processing apparatus according to (29) or (30), wherein the external apparatus is an imaging apparatus.

(32) The information processing apparatus according to (31), wherein the control unit uses the control signal to instruct the imaging apparatus to capture an image.

(33) A control method including:

performing a control so that, when a long-distance wireless communication unit has established a first communication mode in which an external apparatus operates as a master apparatus, authentication information of the information processing apparatus for establishing a second communication mode in which the external apparatus operates as a subsidiary apparatus, is sent to the external apparatus.

(34) A program causing a computer to function as:

a long-distance wireless communication unit configured to perform long-distance wireless communication with an external apparatus; and a control unit configured to perform a control so that, when the long-distance wireless communication unit has established a first communication mode in which the external apparatus operates as a master apparatus, authentication information of an information processing apparatus for establishing a second communication mode in which the external apparatus operates as a subsidiary apparatus, is sent to the external apparatus.

REFERENCE SIGNS LIST 10, 10A, 10B camera
20 information processing apparatus
100, 200 control unit
101 imaging unit
102 image processing unit
103 recording/reading unit
104 recording medium
105, 201 operation input unit
106, 202 display unit
107, 203 storage unit
108, 204 short-distance wireless communication unit
109, 205 long-distance wireless communication unit

The invention claimed is:

1. An information processing apparatus, comprising:

wireless communication circuitry configured to establish, via a network, respective communication connections with external devices in at least one of a first communication mode or a second communication mode, wherein the first communication mode and the second communication mode use a first communication standard; and control circuitry configured to cause the wireless communication circuitry to switch between the first communication mode and the second communication mode based on whether a number of the communication connections with external devices that are active using the first communication standard is one or is more than one, wherein the network is a master-subsidiary network.

2. The information processing apparatus of claim 1, wherein the control circuitry is configured to cause the wireless communication circuitry to:
use the first communication mode when one of the communication connections is active; and
use the second communication mode when more than one of the communication connections are active.

3. The information processing apparatus of claim 1, wherein in the first communication mode the information processing apparatus acts as a client device, and in the second communication mode the information processing apparatus acts as a master device.

4. The information processing apparatus of claim 1, wherein the control circuitry causes the wireless communication circuitry to, in a state in which one of the communication connections is active with a first external device of the external devices, switch from the first communication mode to the second communication mode in response to one of the communication connections being initiated with a second external device of the external devices.

5. The information processing apparatus of claim 4, wherein the communication connection with the second external device is initiated as a result of the second external device being brought into close proximity of the information processing apparatus.

6. The information processing apparatus of claim 4, wherein the control circuitry causes the wireless communication circuitry to, in response to the communication connection being initiated with the second external device, transmit a command to the first external device for the first external device to switch to the second communication mode.

7. The information processing apparatus of claim 4, further comprising:
short-range wireless communication circuitry configured to:
automatically detect the second external device when proximate thereto, and
upon detecting the second external device, exchange authentication information with the second external device using a second communication standard, the authentication information being for establishing the communication connection with the second external device.

8. The information processing apparatus of claim 7, wherein the exchange of the authentication information with the second external device initiates the communication connection with the second external device.

9. The information processing apparatus of claim 4, further comprising:
a display circuitry,
wherein the switching of the wireless communication circuitry from the first communication mode to the second communication mode includes temporarily disconnecting the communication connection with the first external device, and
the control circuitry causes the display circuitry to, while the wireless communication circuitry is switching from the first communication mode to the second communication mode:
display information indicating that the information processing apparatus and the first external device are communicating with each other, and
not display information indicating that the communication connection with the first external device is temporarily disconnected.

10. The information processing apparatus of claim 1, wherein the wireless communication circuitry includes long range wireless communication circuitry and short range wireless communication circuitry.

11. The information processing apparatus of claim 1, wherein the wireless communication circuitry is configured to send an authentication information to a respective external device when the corresponding communication connection between the information processing apparatus and the respective external device is in the first communication mode.

12. An information processing apparatus, comprising:
wireless communication circuitry configured to establish, via a network, respective communication connections with external devices in at least one of a first communication mode or a second communication mode, wherein the first communication mode and the second communication mode use a predetermined communication standard; and
control circuitry configured to cause the wireless communication circuitry to switch between the first communication mode and the second communication mode based on a predetermined condition being met,
wherein the predetermined condition is related to whether a plurality of the communication connections are concurrently active using the predetermined communication standard, and
wherein the network is a master-subsidiary network.

13. The information processing apparatus of claim 12, wherein the predetermined condition is met when there is at least one of the communication connections that is active using the predetermined communication standard and establishment of a second one of the communications connections using the predetermined communication standard is initiated.

14. The information processing apparatus of claim 12, wherein the predetermined condition is met when one of the external devices is brought into close proximity of the information processing apparatus.

15. An information processing system comprising:
an information processing apparatus;
a first external device; and
a second external device,
wherein the information processing system includes wireless communications circuitry that is configured to establish, via a network, respective communication connections between the information processing apparatus and the first and second external devices in at least one of a first communication mode or a second communication mode, wherein the first communication mode and the second communication mode use a first communication standard,
wherein the information processing system includes control circuitry that is configured to cause the wireless communications circuitry to, in a state in which one of the communications connections using the first communication standard is active between only the first external device and the information processing apparatus, switch from the first communication mode to the second communication mode based on one of the communications connections using the first communication standard being initiated between the second external device and the information processing apparatus, and
wherein the network is a master-subsidiary network.

16. The information processing system of claim 15, wherein the control circuitry is included in the information processing apparatus and is configured to cause the wireless communications circuitry to switch between the first communication mode and the second communication mode by generating instructions to operate in the second communication mode that are transmitted from the information processing apparatus to the first and second external devices.

17. The information processing system of claim 15,
wherein in the first communication mode the information processing apparatus acts as a client device, and
in the second communication mode the information processing apparatus acts as a master device.

18. The information processing system of claim 15,
wherein the communication connection between the second external device and the information processing apparatus is initiated as a result of the second external device being brought into close proximity of the information processing apparatus.

19. The information processing system of claim 15,
wherein the information processing apparatus includes short-range wireless communication circuitry configured to:
   automatically detect the second external device when proximate thereto, and
   upon detecting the second external device, exchange authentication information with the second external device using a second communication standard, the authentication information being for establishing the communication connection between the second external device and the information processing apparatus, and
wherein the exchange of the authentication information with the second external device initiates the communication connection between the second external device and the information processing apparatus.

* * * * *